Nov. 11, 1958 P. A. CASTRUCCIO 2,860,307
MICROWAVE PEAK POWER METER
Filed Jan. 13, 1954 2 Sheets-Sheet 1

INVENTOR.
PETER A. CASTRUCCIO
BY
Billy G. Corken

Nov. 11, 1958     P. A. CASTRUCCIO     2,860,307
MICROWAVE PEAK POWER METER
Filed Jan. 13, 1954                    2 Sheets-Sheet 2

INVENTOR.
PETER A. CASTRUCCIO
BY

United States Patent Office 2,860,307
Patented Nov. 11, 1958

2,860,307

MICROWAVE PEAK POWER METER

Peter A. Castruccio, Baltimore, Md., assignor to Aircraft Armaments, Inc., Baltimore, Md., a corporation of Maryland Application January 13, 1954, Serial No. 403,707

7 Claims. (Cl. 324—130)

This invention relates generally to microwave peak power meters and more particularly to such a meter for measuring pulsed microwave energy.

An object of this invention is to provide a peak power meter adapted to measure the peak power of microwave energy at any pulse width or repetition rate.

Another object of this invention is to provide a peak power meter for pulsed microwave energy which is relatively simple in design, which will operate with low power requirements, and which may be compactly arranged as a lightweight portable unit.

Another object of this invention is to provide a peak power meter capable of measuring the peak power of microwave energy at low power levels in the order of 1 milli-watt.

Still another object of this invention is to provide a peak power meter for pulsed microwave energy which is dependable and accurate in operation and which provides a direct reading measurement.

Further and other objects will become apparent from a reading of the following description when considered in combination with the accompanying drawing wherein like numerals refer to like parts.

Figure 1:
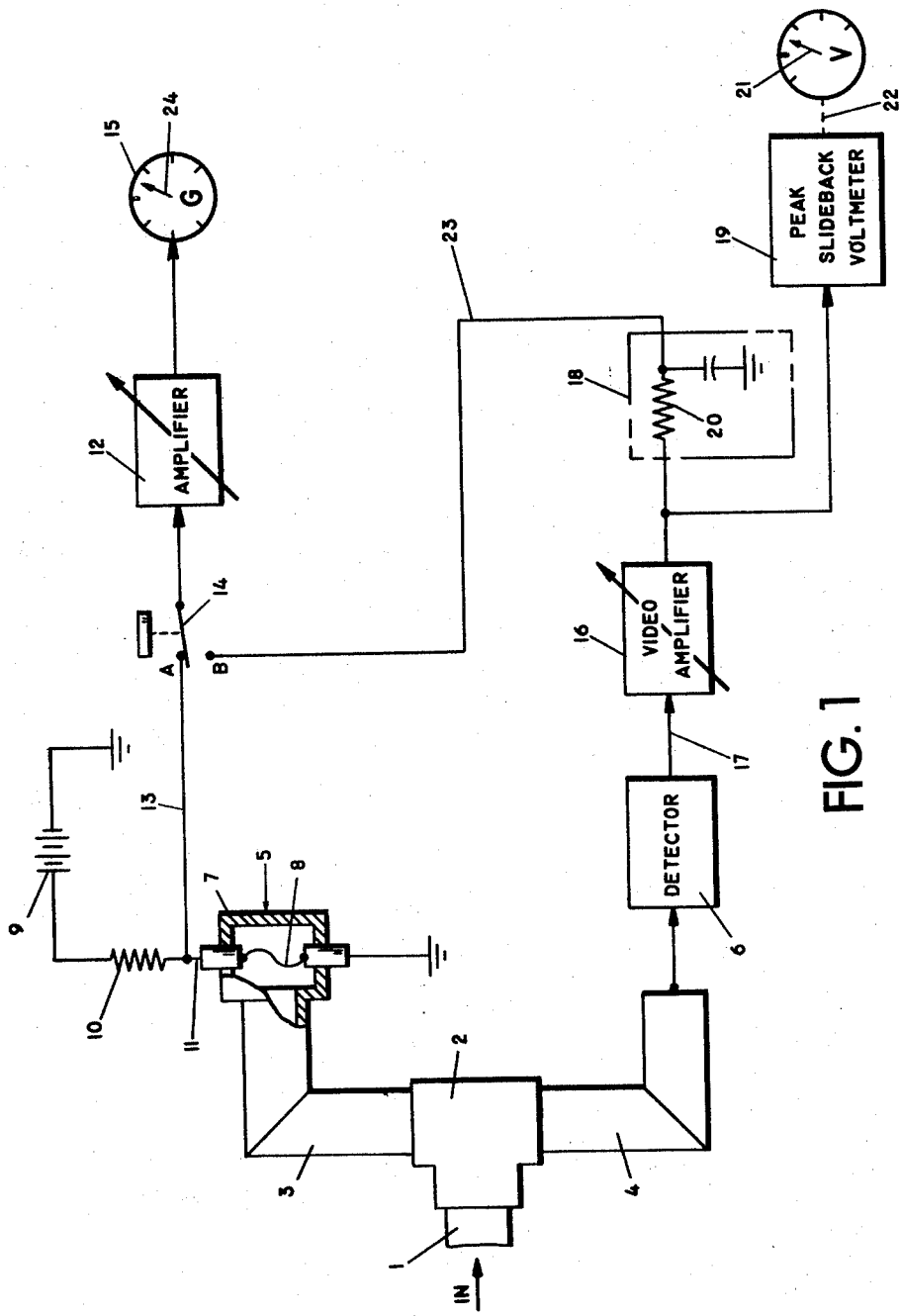
Figure 1 is a schematic circuit diagram of the peak power meter of this invention.

Referring to Figure 1, the power meter includes an input waveguide 1 for receiving microwave energy, the peak power of which is to be measured. The input waveguide connects with a suitable hybrid waveguide junction 2, commonly known as a "magic T", which directs the energy into two separate waveguide legs 3 and 4. The energy flowing in leg 3 is fed to a barreter wire unit 5, and the energy in leg 4 is fed to a video crystal detector 6.

Barreter wire unit 5 comprises a housing 7 enclosing a barreter wire 8 therein so that microwave energy from leg 3 will be applied to the barreter wire externally in the normal manner. A direct current voltage generated by a suitable source of electrical potential 9 is applied to the barreter wire 8 through a biasing resistor 10. The resistance of barreter wire 8 changes in response to changes in the power level of the microwave energy applied through leg 3, causing the current flow through the direct current circuit to also vary, producing a voltage change in lead 11 which is proportional to the change in the power level of the microwave energy applied to the barreter wire. The direct current voltage in lead 11, called the barreter output voltage, is applied to a variable gain amplifier 12 through lead 13. The output of amplifier 12 is applied to a galvanometer 15 which is calibrated to read in milli-watts the peak power of the microwave energy applied to barreter wire unit 5.

Figure 2:
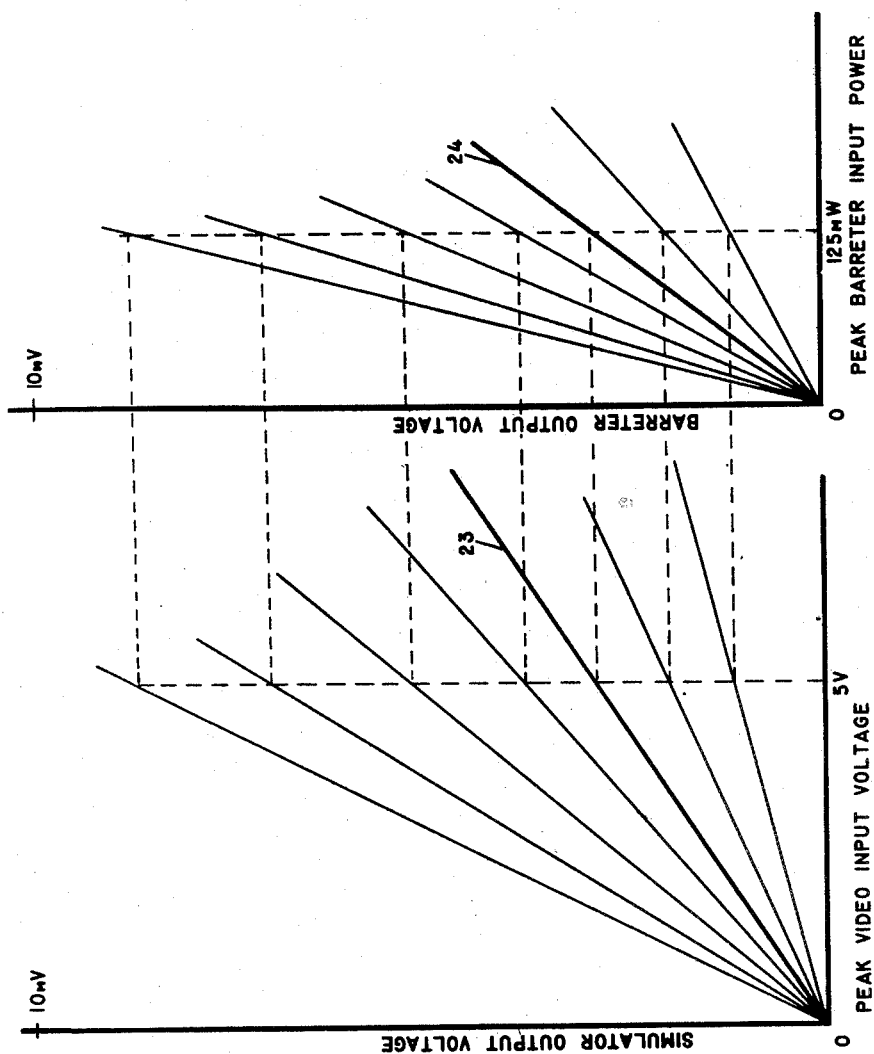
Figure 2 is a graphical presentation illustrating the operation of the peak power meter shown in Figure 1.

While the voltage in lead 11 varies linearly with the power level of microwave energy applied to barreter wire 8, the slope of the characteristic curves representing the rate of change of the barreter output voltage with respect to the microwave power level is different for different pulse widths or different repetition rates of the microwave energy as illustrated graphically in Figure 2. For any given pulse width and repetition rate of the microwave energy, there is but one characteristic curve representing the variation in barreter output voltage versus the peak barreter input power. A different pulse width or repetition rate will produce a new characteristic curve such that an infinite number of curves must be shown to indicate barreter operation for all waveforms of the microwave energy which may be applied to the power meter.

Since the slope of the characteristic curves representing the rate of change of the barreter output voltage with respect to the peak barreter input power is not constant for all waveforms, galvanometer 15 must be adjusted for the particular pulse width and repetition rate of the energy being measured. This calibrating of galvanometer 15 is accomplished as hereinafter described by generating a voltage which is substantially equal to the barreter output voltage which would be produced were microwave energy at a known power level applied to the barreter having the same pulse width and repetition rate as the microwave energy being measured, and applying the voltage to the galvanometer.

The output from video crystal detector 6 is a video signal having a waveform substantially identical to the waveform of the microwave energy applied to barreter wire unit 5. The video signal is applied to a variable gain video amplifier 16 through an electrical lead 17 as shown in Figure 1. The output from video amplifier 16 is applied to a barreter simulator 18 and to a peak slideback voltmeter 19.

Barreter simulator 18 comprises a resistor-condenser integrating network having an RC constant equal to that of the barreter wire. When video energy at a certain peak voltage level is applied to the barreter simulator, an output voltage will be obtained which is substantially equal to the barreter output voltage when microwave energy of a known peak power level and similar waveform is applied to the barreter wire.

For example, for an RC or time constant of 320 microseconds, when video energy having a 5-volt peak value is applied to the resistor-condenser network, the output voltage therefrom will equal the output voltage from the barreter wire unit when microwave energy having the same pulse width and repetition rate is applied to the barreter wire at a peak power level of 125 milli-watts. This is illustrated in Figure 2 wherein two different plots are shown in a side-by-side arrangement. The simulator output voltage is plotted against the peak video input voltage applied to the barreter simulator, and the barreter output voltage is plotted against the peak barreter input power for several different pulse widths and repetition rates of microwave energy. Lines 23 and 24 represent the voltage output characteristics of barreter simulator 18 and the barreter wire unit 5, respectively, for a given waveform. As indicated in the drawing, when the peak video input voltage applied to the barreter simulator is 5 volts, the simulator output voltage is equal to the barreter output voltage when microwave energy of the same pulse width and repetition rate is applied to the barreter wire at a peak power level of 125 milliwatts. This relationship exists for any pulse width or repetition rate except, of course, the magnitude of the output voltages will vary with different pulse widths and repetition rates. It is this relationship between barreter wire unit 5 and barreter simulator 18 which is employed to calibrate galvanometer 15 for any particular waveform to provide direct reading of the peak power level.

Peak slideback voltmeter 19 drives a suitable direct reading indicator 21 through shaft 22 to visually indicate the peak power of the video energy applied to barreter simulator 18. By adjusting the gain of video amplifier 16 so that the peak power level of the video energy is at a predetermined value, the integrating network 20 will simulate the barreter wire output at a known power level of the energy applied to the barreter wire.

A two-position manually-operable switch 14 is inserted in lead 13 between the ends thereof for selectively making and breaking the circuit between barreter wire unit 5 and variable gain amplifier 12, as shown in Figure 1. When switch 14 is in position A, the barreter wire output voltage in lead 11 is applied to amplifier 12 to drive galvanometer 15. When switch 14 is in position B, the circuit from the barreter wire unit is broken and the output voltage from barreter simulator 18 is applied to amplifier 12 through lead 23.

The operation of the peak power meter is believed obvious from a reading of the foregoing description. The microwave energy applied to detector 6 through input waveguide 1 and leg 4 is amplified in video amplifier 16 so that a peak voltage of predetermined amount is obtained. For a particular selection of power meter components wherein barreter wire 8 and barreter simulator 18 have a time constant of 320 micro-seconds, the predetermined peak video input to simulator 18 should be 5 volts in order to simulate the voltage output of the barreter wire upon the application of microwave energy at a peak power level of 125 milli-watts. This 5 volt peak voltage setting is readily obtained by varying the gain of amplifier 16 until indicator 21, driven by slideback voltmeter 19, reads the desired peak voltage. Then switch 14 is moved to position B, completing the circuit from barreter simulator 18 to variable gain amplifier 12. Since it is known that the output voltage from barreter simulator 18 is substantially equal to the output voltage of the barreter wire 8 upon the application of microwave energy having the same pulse width and repetition rate when the predetermined peak voltage is applied to the simulator, galvanometer 15 may be calibrated to indicate the known peak power level of 125 milli-watts. This last-mentioned step in the operation of the power meter enables positioning the galvanometer so that it will read the peak barreter input power in accordance with the proper characteristic curve shown in Figure 2 for the pulse width and repetition rate of the energy applied to the power meter. Calibration of galvanometer 15 is readily accomplished by adjusting the gain of amplifier 12 until the indicator arm 24 of galvanometer 15 is aligned with the known power level value appearing on the face of the instrument. After galvanometer 15 has been properly calibrated, switch 14 is moved to position A, completing a circuit from barreter wire unit 5 to amplifier 12. The barreter wire output voltage, the magnitude of which is determined by the microwave energy applied to barreter wire 8, is applied to amplifier 12 for driving galvanometer 15. By holding the gain setting of amplifier 12 to that established through the use of barreter simulator 18, galvanometer 15 will accurately indicate the peak power level of the microwave energy applied to the power meter.

To measure the peak power level of microwave energy having a different pulse width or repetition rate, it is merely necessary to adjust video amplifier 16 to again provide a peak output of 5 volts, which magnitude is constant for all pulse widths and repetition rates and is established by the particular design characteristics of the components used in the power meter. The video voltage from amplifier 16 is applied to simulator 18 to produce an output from the simulator which is substantially equal to the output voltage from barreter wire unit 5 when microwave energy at a peak power level of 125 milli-watts is applied to the barreter wire. The output voltage from barreter simulator 18 is applied to amplifier 12 for recalibrating galvanometer 15 so that it will read in accordance with the proper characteristic curve shown in Figure 2 for the pulse width and repetition rate of the microwave energy being applied to the power meter. When the galvanometer is properly calibrated, it will accurately indicate the peak power level of the microwave energy at the new pulse width and repetition rate.

The power meter described herein provides a simple, straightforward method for accurately measuring the peak power level of either continuous microwave energy or pulsed microwave energy at any pulse width or repetition rate.

It is to be understood that certain alterations, modifications and substitutions may be made to this disclosure without departing from the spirit and scope of the invention as defined by the appended claims.

I claim:

1. A peak power meter for measuring the peak power of pulsed microwave energy comprising, input waveguide means for receiving microwave energy the peak power of which is to be measured, a pair of waveguide legs connecting with said input waveguide and receiving microwave energy from said input waveguide means, a barreter wire unit connecting with one of said pair of waveguide legs and responsive to the energy flowing therein to produce a barreter output voltage proportional to the power level of said microwave energy, detector means connecting with the other of said pair of waveguide legs and responsive to microwave energy flowing therein to produce video energy having a waveform similar to that of said microwave energy, a first variable gain amplifier responsive to the video output from said detector for producing a video output at a predetermined peak voltage level, an integrating network having a time constant substantially equal to the time constant of said barreter wire unit and electrically connecting with said first variable gain amplifier to receive the output therefrom and produce a calibrating voltage, peak voltage measuring means connecting with said first variable gain amplifier to indicate the peak voltage level of the output therefrom, a second variable gain amplifier, switch means connecting with said second variable gain amplifier and with said barreter wire unit and with said integrating network for selectively applying the outputs from said barreter wire unit and said integrating network to said second variable gain amplifier, and a galvanometer connecting with the output from said second-mentioned variable gain amplifier for indicating the peak power level of the microwave energy applied to said power meter, said integrating network producing an output voltage in response to the predetermined peak video input voltage which simulates the barreter wire unit output voltage in response to the application of microwave energy at a known power level and similar waveform whereby to calibrate said galvanometer for accurately indicating the peak power level of the microwave energy applied to said power meter through said input waveguide means.

2. A peak power meter for measuring the peak power of pulsed microwave energy comprising, input waveguide means for receiving microwave energy, the peak power of which is to be measured, and directing said energy down two separate paths, a barreter wire unit responsive to the energy in one of said paths, a source of electrical potential connecting with said barreter wire unit to provide a barreter output voltage the magnitude of which varies linearly with the power of the microwave energy applied to said barreter wire, barreter simulating means responsive to the microwave energy in the other of said paths to generate a voltage substantially equal to the output voltage produced by said barreter wire unit in response to the application of microwave energy having a known peak power level and a waveform similar to that of the microwave energy flowing in said one path, power indicating means, switch means selectively connecting said power indicating means with said barreter wire unit and with said barreter simulating means, and calibrating means comprising said barreter simulating means and means for measuring the input to said barreter simulating means, both connecting with said power indicating means through said switch means for calibrating the latter in response to the output from the barreter simulating means to accurately indicate the peak power level of the microwave energy applied to said barreter wire unit.

3. A peak power meter for measuring the peak power of pulsed microwave energy comprising, input waveguide means for receiving and directing microwave energy, the peak power of which is to be measured, down two separate paths, a barreter wire unit responsive to energy in one of said paths, a source of electrical potential connecting with said barreter wire unit to provide a barreter voltage output the magnitude of which varies linearly with the power of the microwave energy in said one path, a detector responsive to the microwave energy flowing in the other of said paths and producing video energy having substantially the same waveform as the microwave energy, a variable gain video amplifier electrically connecting with said detector and responsive to the video output thereof, a barreter simulator connecting with said amplifier and producing a voltage output which varies linearly with the peak voltage of the amplifier output and which is substantially equal to the voltage output of the barreter wire unit in response to microwave energy at a known peak power level when the peak voltage from said amplifier is at a predetermined value, means connecting with said amplifier for adjusting the gain thereof to provide a barreter simulator input which is at said predetermined peak voltage, a variable gain amplifier, switch means connecting with the second-mentioned amplifier, with the barreter output and with the barreter simulator output, for selectively connecting said barreter wire unit and said barreter simulator to said second mentioned amplifier, and a galvanometer connecting with said second-mentioned amplifier and responsive to the output therefrom for indicating the peak power level of the microwave energy applied to said power meter.

4. A wattmeter for measuring the peak power of microwave energy comprising, a galvanometer, a variable gain amplifier electrically connecting with said galvanometer, barreter means responsive to the microwave energy and generating a voltage output, the magnitude of which varies linearly with the power of the microwave energy, simulating means responsive to the microwave energy and generating a voltage output simulating the voltage output of said first-mentioned means at a certain predetermined peak power level of the microwave energy, means for adjusting the input to said simulating means, means for measuring said input, and switch means connecting said amplifier with said simulating means for calibrating said galvanometer and with said first-mentioned means for indicating the peak power of said microwave energy.

5. A wattmeter for measuring the peak power of microwave energy comprising, a galvanometer, a variable gain amplifier electrically connecting with said galvanometer, switch means connecting with said amplifier, barreter wire means connecting with said switch means and responsive to the microwave energy to generate a voltage proportional to the power thereof, calibrating means connecting with said switch means, said calibrating means including a video detector arranged to receive the microwave energy and produce video energy having substantially the same waveform, a variable gain amplifier connecting with said video detector for selectively varying the amplitude of the video energy passing therethrough, a peak slideback voltmeter connecting with the second-mentioned variable gain amplifier and responsive to the video output thereof to indicate the peak voltage, and barreter simulating means connecting with said second variable gain amplifier and with said switch means and having an output substantially equal to the output from said barreter wire means in response to microwave energy at a known peak power level at a predetermined peak voltage output from said second-mentioned variable gain amplifier, said switch means selectively connecting said first-mentioned variable gain amplifier with said calibrating means for calibrating said galvanometer and with said barreter wire means to indicate the peak power level of the microwave energy applied thereto.

6. A wattmeter for measuring the peak power of microwave energy comprising, indicating means, a variable gain amplifier electrically connecting with said indicating means, switch means connecting with said amplifier, power sensitive means connecting with said switch means and responsive to the microwave energy to be measured and producing a signal voltage which varies substantially linearly with variations in the power level of the microwave energy, and calibrating means connecting with said switch means and responsive to the microwave energy to be measured and having a voltage output at a predetermined peak input voltage level substantially equal to the voltage output of said power sensitive means in response to microwave energy at a known peak power level, said calibrating means including a variable gain amplifier adjustable to produce said predetermined peak input voltage level for calibrating said indicating means for microwave energy of any given waveform to accurately measure the peak power level thereof.

7. The method of measuring the peak power of microwave energy comprising, applying the microwave energy to a barreter and to a video detector, modifying the detector output to produce a desired peak voltage, feeding the modified detector output through a condenser-resistor integrating network having a time constant providing a voltage output at the desired peak voltage equal to the voltage output from the barreter where microwave energy at a predetermined power level and similar waveform applied thereto, feeding the output from the condenser-resistor integrating network through a variable gain amplifier to drive a galvanometer calibrated to read power, adjusting the gain of said amplifier until the galvanometer indicates the known peak power when said desired voltage is applied to said amplifier, and then connecting the barreter output to said amplifier to indicate the peak power of said microwave energy.

References Cited in the file of this patent

UNITED STATES PATENTS 2,434,334    Sheppard         Jan. 13, 1948